United States Patent
Ishii et al.

(10) Patent No.: US 6,407,934 B1
(45) Date of Patent: Jun. 18, 2002

(54) DC/DC SWITCHING POWER SUPPLY WITH OPTIMALLY TIMED SYNCHRONOUS RECTIFIER

(75) Inventors: Takuya Ishii, Suita; Toshio Hamaguchi, Shozu-gun; Takaharu Murakami, Matsusaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/867,828

(22) Filed: May 30, 2001

(30) Foreign Application Priority Data

May 31, 2000 (JP) .................................... 2000-162414

(51) Int. Cl.$^7$ ............................................ H02M 3/335
(52) U.S. Cl. ................................ 363/21.14; 363/127
(58) Field of Search ....................... 363/16, 20, 21.06, 363/21.12, 21.14, 127, 131

(56) References Cited

U.S. PATENT DOCUMENTS

| | | | | |
|---|---|---|---|---|
| 5,057,986 A | | 10/1991 | Henze et al. .................. 363/20 |
| 5,099,406 A | * | 3/1992 | Harada et al. ................. 363/20 |
| 5,206,800 A | * | 4/1993 | Smith ....................... 363/21.14 |
| 5,383,106 A | | 1/1995 | Yoshida et al. ................ 363/15 |
| 5,402,329 A | * | 3/1995 | Wittenbreder ................. 363/16 |
| 5,430,633 A | | 7/1995 | Smith .......................... 363/20 |
| 5,726,869 A | * | 3/1998 | Yamashita et al. ......... 363/21.06 |
| 5,734,563 A | * | 3/1998 | Shinada .................... 363/21.06 |
| 5,784,266 A | * | 7/1998 | Chen .......................... 363/127 |
| 5,991,167 A | * | 11/1999 | Van Lerberghe ............. 363/131 |
| 6,011,703 A | * | 1/2000 | Boylan et al. ............ 363/21.14 |
| 6,058,026 A | * | 5/2000 | Rozman .................. 363/21.14 |
| 6,069,803 A | * | 5/2000 | Cross ..................... 363/21.14 |
| 6,201,714 B1 | * | 3/2001 | Liang ..................... 363/21.14 |

FOREIGN PATENT DOCUMENTS

JP 2845188 10/1998 ............ H02M/3/28

OTHER PUBLICATIONS

WO 90/16110, Circuit Network, Dec. 27, 1990.

* cited by examiner

Primary Examiner—Jeffrey Sterrett
(74) Attorney, Agent, or Firm—Pearne & Gordon LLP

(57) ABSTRACT

A switching power converter of the present invention, wherein a series circuit comprising the primary winding 31 of a transformer and a first switch 2 is connected in parallel with a DC input power supply 1, and a series circuit comprising a capacitor 8 and a second switch 7 is connected in parallel with the primary winding 31; the switching power converter is provided with a first control drive circuit 9 for alternately turning on/off the first switch 2 and the second switch 7 so as to have an on-period, an off-period and a rest period, and a second control drive circuit for turning on/off the third switch 41 connected to the secondary winding 32 of the transformer, whereby the current flowing through the secondary winding of the transformer has a resonance waveform.

10 Claims, 11 Drawing Sheets

(a) The primary current flowing through the primary winding 704A (b) The voltage generating at the auxiliary secondary winding 704C (c) The secondary current flowing through the secondary winding 7004B

DC/DC SWITCHING POWER SUPPLY WITH OPTIMALLY TIMED SYNCHRONOUS RECTIFIER

BACKGROUND OF THE INVENTION

The present invention relates to a switching power converter for use in various electronic apparatuses, and more particularly to a synchronous rectifying circuit in the switching power converter.

Technologies regarding synchronous rectifying circuits in conventional switching power converters for use in various electronic apparatuses have been disclosed, for example, in the Japanese Laid-open Patent Application, Publication No. Hei 5-137326. FIGS. 8 and 9 are circuit diagrams of switching power converters disclosed in the Japanese Laid-open Patent Application, Publication No. Hei 5-137326.

A conventional switching power converter shown in FIG. 8 is configured so that an AC input Vin is rectified by a rectifying diode bridge 601 and a DC high voltage (100 V for example) is generated at a smoothing capacitor 602. Energy is stored in and released from the excited inductance of a transformer 604 by a power MOSFET 603 on/off-controlled by a control circuit (not shown). A rectifying diode 620 is connected to the secondary winding of the transformer 604, and the current in the secondary winding of the transformer 604 flows through the diode 620 to charge a smoothing capacitor 606. In addition, the current is smoothed by a smoothing reactor 608 and a smoothing capacitor 607, and a DC voltage is output as a DC output Vout. Since the diode 620 is used in the conventional switching power converter configured as described above, the proportion of a loss owing to the diode 620 in the total loss of the apparatus becomes large when obtaining a DC output of a low voltage (3 V for example), thereby raising a problem.

A conventional switching power converter shown in FIG. 9 has been proposed to solve the problem encountered in the switching power supply circuit shown in FIG. 8. In the switching power converter shown in FIG. 9, instead of the diode 620 shown in FIG. 8, a power MOSFET 705 is connected. In the switching power converter shown in FIG. 9, an N-channel MOSFET is used as the power MOSFET 705. The on/off control of the power MOSFET 705 is carried out by using a voltage generating in the auxiliary secondary winding 704C of a transformer 704. The conventional switching power converter shown in FIG. 9 has a lower conduction loss in comparison with the apparatus comprising the rectifying circuit including the diode shown in FIG. 8, and therefore has high power efficiency in the whole apparatus.

FIG. 10 is a waveform diagram of the synchronous rectifying circuit of the switching power converter shown in FIG. 9. A part (a) of FIG. 10 shows the waveform of a primary current flowing through the power transistor 603 serving as a main switch, a part (b) of FIG. 10 shows the waveform of a voltage generating at the auxiliary secondary winding 704C of the transformer 704, and a part (c) of FIG. 10 shows the waveform of a secondary current flowing through the power MOSFET 705. Synchronous rectifying means that a switching device, such as the power MOSFET 705, is used as a rectifying switch as described above.

A problem arising in the above-mentioned switching power converter is to control the timing of the on/off control of the synchronous rectifying switch highly accurately. For example, if the turn-on timing of the synchronous rectifying switch in the switching power converter shown in FIG. 9 is too early, a large turn-on loss occurs because the voltage of the synchronous rectifying switch is not lowered sufficiently. Conversely, if the turn-on timing of the synchronous rectifying switch is too late, a conduction loss at a body diode inside the synchronous rectifying switch increases. On the other hand, if the turn-off timing of the synchronous rectifying switch is too early, the conduction loss at the above-mentioned body diode increases. Conversely, if the turn-off timing of the synchronous rectifying switch is too late, a period occurs during which the synchronous rectifying switch and the main switch turn on simultaneously. As a result, a large loss owing to a short-circuit current occurs.

In the conventional switching power converter shown in FIG. 9, the turn-off of the synchronous rectifying switch 705 is carried out by the voltage reversion of the auxiliary secondary winding 704C. This voltage reversion takes place when the main switch 603 turns on. Hence, a period occurs during which the main switch 603 and the synchronous rectifying switch 705 turn on simultaneously, although the period is instantaneous. As a result, a large loss owing to a short-circuit current occurs in the conventional switching power converter.

In addition, as a conventional switching power converter of a transformer-insulation type, wherein an AC voltage generated at a secondary winding is synchronously rectified and a power is supplied to a load, apparatuses disclosed in U.S. Pat. No. 5,383,106 and U.S. Pat. No. 5,430,633 are available. Both the switching power converters are flyback converters wherein a series circuit comprising a capacitor and a switch is connected to the primary winding of a transformer. In these apparatuses, when magnetic energy stored in the transformer is released from the secondary winding, an inductance and a capacitor connected equivalently in series with the winding of the transformer cause resonance, and the current flowing through the secondary winding has a resonance waveform. U.S. Pat. No. 5,430,633 discloses a circuit wherein rectifying means connected to the secondary winding is a synchronous rectifier. FIG. 11 is a circuit diagram of a switching power converter with a synchronous rectifier disclosed in U.S. Pat. No. 5,430,633. FIG. 11 simply shows only the main configuration portion of the switching power converter with the synchronous rectifier disclosed in U.S. Pat. No. 5,430,633.

As shown in FIG. 11, in the switching power converter of U.S. Pat. No. 5,430,633, a capacitor 125 and two switches 110 and 120 are connected to the primary winding 132 of a transformer 130. The two switches 110 and 120 comprise transistors 111 and 121 and the body diodes 112 and 122 thereof, respectively. A coil 142 and a capacitor 144 are connected in series with the secondary winding 134 of the transformer 130 so as to produce resonance. Furthermore, a synchronous rectifier 440 having a synchronous rectifying transistor 441 and a body diode 442 is connected to the secondary winding 134 of the transformer 130. This synchronous rectifying transistor 441 is configured so as to be controlled depending on the change of the voltage of the tertiary winding 136 of the transformer 130. Still further, the output Vout of this switching power converter is fed back to the switches 110 and 120 via control means 160.

A problem arising in the switching power converter configured as described above is to control the timing of the on/off control of the synchronous rectifying transistor 441 highly accurately. In the conventional switching power converter shown in FIG. 11, the on/off control of the synchronous rectifying transistor 441 is based on the change of the voltage of the tertiary winding 136. After the first switch 110 (hereafter referred to as the first switch) on the primary side of the transformer 130 turns off, when the voltage of the tertiary winding 136 of the transformer 130 becomes higher than the threshold value of the gate voltage of the synchronous rectifying transistor 441, the synchronous rectifying transistor 441 turns on. Therefore, the turn-on of the synchronous rectifying transistor 441 may become earlier than the turn-on (the start of conduction of the body diode 442) of the synchronous rectifier 440 or the turn-on (the start of conduction of the body diode 122) of the second switch 120 (hereafter referred to as the second switch) on the primary side of the transformer 130. In this case, a turn-on loss occurs because the voltage of the synchronous rectifying transistor 441 is not lowered sufficiently. On the other hand, after the switching transistor 121 of the second switch 120 turns off, when the voltage of the tertiary winding 136 becomes lower than the threshold value of the gate voltage of the synchronous rectifying transistor 441, the synchronous rectifying transistor 441 turns off. For this reason, a period occurs during which a reverse current after a half period of resonance flows through the synchronous rectifying transistor 441, thereby raising a problem of returning a power to the primary of the transformer 130. Furthermore, a period occurs during which the synchronous rectifying transistor 441 and the first switch 110 turn on simultaneously, although the period is instantaneous, thereby raising a problem of a power loss.

The present inversion is intended to solve the above-mentioned problems and to provide a switching power converter capable of optimizing the timing of control for turning on/off a synchronous rectifying transistor.

SUMMARY OF THE INVENTION

In order to attain the above-mentioned object, a switching power converter in accordance with the present invention comprises:
  a DC input power supply;
  a transformer having at least a primary winding and a secondary winding;
  a first switch connected in series with the primary winding to form a series circuit, the series circuit being connected in parallel with the DC input power supply;
  a second switch connected equivalently across the both ends of the primary winding via a capacitor;
  a third switch connected in series with the secondary winding;
  a first control drive circuit for alternately turning on/off the first switch and the second switch and having predetermined on-periods, off-periods and rest periods by detecting the output of the series circuit of the third switch and the secondary winding; and
  a second control drive circuit for turning on the third switch after a predetermined period from the turn-on of the second switch and for turning off the third switch before a predetermined period from the turn-off of the second switch.

In the switching power converter configured as described above, since the current flowing on the secondary side of the transformer has a resonance waveform, a conduction loss owing to the drive timing of the switch for synchronous rectification occurs less, whereby the current capacity of the diode connected in parallel with the switch can be reduced.

A switching power converter in accordance with another aspect of the present inversion comprises:
  a DC input power supply;
  a series circuit of a first switch and a second switch connected in parallel with the DC input power supply;
  a transformer having at least a primary winding and a secondary winding;
  a capacitor connected across both ends of any one of the first switch and the second switch via the primary winding;
  a third switch connected in series with the secondary winding;
  a first control drive circuit for alternately turning on/off the first switch and the second switch and having predetermined on-periods, off-periods and rest periods by detecting the output of the series circuit of the third switch and the secondary winding; and
  a second control drive circuit for turning on the third switch after a predetermined period from the turn-on of the second switch and for turning off the third switch before a predetermined period from the turn-off of the second switch.

In the switching power converter configured as described above, since the current flowing on the secondary side of the transformer has a resonance waveform, a conduction loss owing to the drive timing of the switch for synchronous rectification occurs less, whereby the current capacity of the diode connected in parallel with the switch can be reduced.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Preferable embodiments in accordance with a switching power converter of the present inversion will be described below referring to the accompanying drawings.

<<Embodiment 1>>

Figure 1:
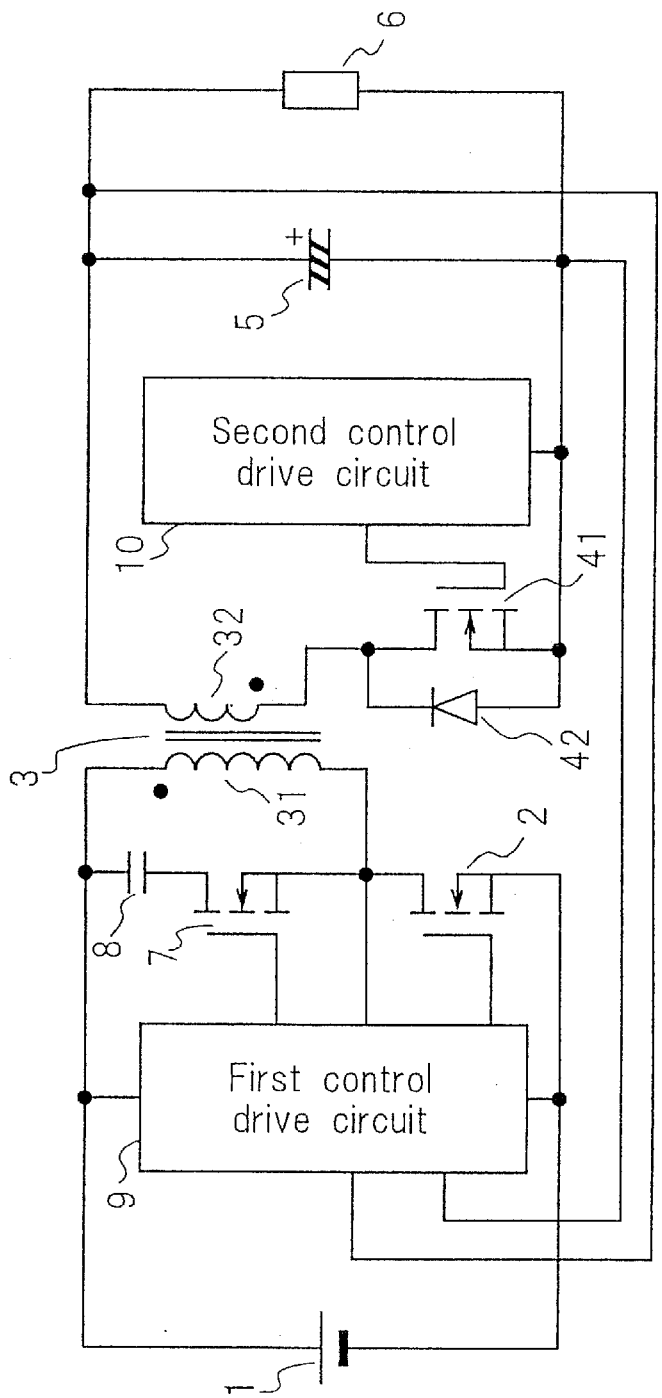
FIG. 1 is a circuit diagram showing the configuration of a switching power converter in accordance with Embodiment 1 of the present invention.
Figure 2:
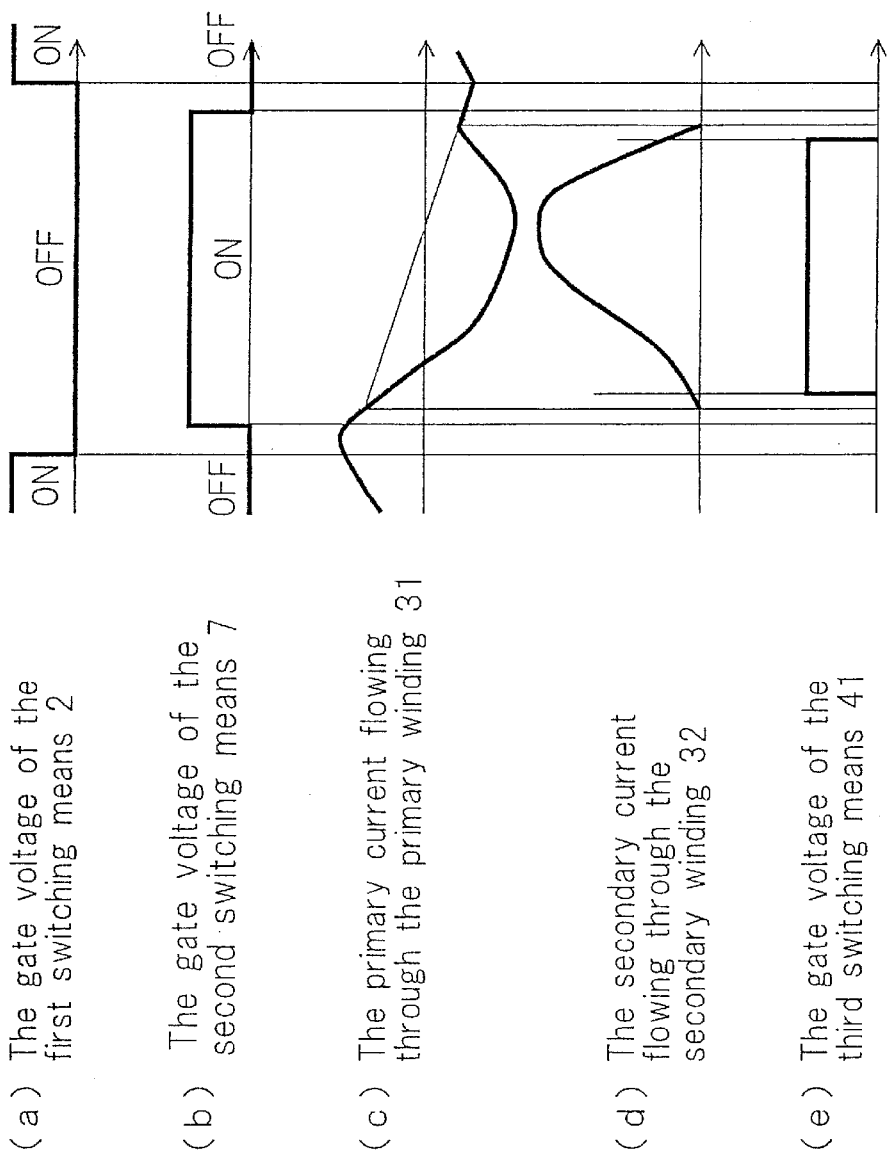
FIG. 2 is a waveform diagram at the main portions of the switching power converter shown in FIG. 1.

FIG. 1 is a circuit diagram showing the configuration of a switching power converter of Embodiment 1 in accordance with the present invention. FIG. 2 is a waveform diagram at the main portions of the switching power converter shown in FIG. 1. As shown in FIG. 1, an input DC power supply 1 is connected in parallel with a first control drive circuit 9 and a series circuit comprising a first switch 2, a second switch 7 and a capacitor 8. The first control drive circuit 9 alternately turns on/off the first switch 2 and the second switch 7 while having predetermined on-periods, off-periods and rest periods. The first switch 2 is an N-channel MOSFET, and the second switch 7 is an N-channel MOSFET. A transformer 3 has a primary winding 31 and a secondary winding 32. A series circuit comprising the first switch 2 and the primary winding 31 is connected across both ends of the input DC power supply 1. Furthermore, a series circuit comprising the second switch 7 and the capacitor 8 is connected in parallel with the primary winding 31.

A parallel circuit comprising a third switch 41 and a diode 42 is connected in series to the secondary winding 32 of the transformer 3. The third switch 41 is an N-channel MOSFET and on/off-controlled so as to have predetermined on and off-periods by a second control drive circuit 10. As shown in FIG. 1, an output capacitor 5 and a load 6 are connected in parallel with a series circuit comprising the secondary winding 32 and the parallel circuit comprising the third switch 41 and the diode 42.

In the switching power converter of Embodiment 1 shown in FIG. 1, the parallel circuit comprising the third switch 41 and the diode 42, connected in series to the secondary winding 32, forms a rectifying smoothing circuit together with the second control drive circuit 10 and the output capacitor 5. This rectifying smoothing circuit is configured to supply an output DC voltage to the load 6.

In the switching power converter of Embodiment 1, the first control drive circuit 9 has a function of determining the on-periods and the off-periods of the first switch 2 and the second switch 7 thereby to stabilize the output DC voltage. The second control drive circuit 10 has a function of turning on the third switch 41 after a predetermined period from the turn-on of the second switch 7 and turning off the third switch 41 before a predetermined period from the turn-off of the second switch 7.

Next, the operations of the switches of the switching power converter of Embodiment 1 will be described.

FIG. 2 is the waveform diagram at the main portions of the switching power converter of Embodiment 1. A part (a) of FIG. 2 shows the waveform of the gate voltage of the first switch 2, a part (b) shows the waveform of the gate voltage of the second switch 7, a part (c) shows the waveform of a primary current flowing through the primary winding 31 of the transformer 3, a part (d) shows the waveform of a secondary current flowing through the secondary winding 32 of the transformer 3, and a part (e) shows the waveform of the gate voltage of the third switch 41.

First, when the first switch 2 is an on-state (the area indicated by "ON" in the part (a) of FIG. 2), the primary current flows through the primary winding 31 from the input DC power supply 1 as shown in the part (c) of FIG. 2, and excited energy is stored in the transformer 3. When the first switch 2 turns off (see the part (a) of FIG. 2), the stored excited energy is released, whereby the winding voltages of the transformer 3 are reversed. When the excited energy is stored in the transformer 3, and when the voltage of the primary winding 31 reaches the voltage of the capacitor 8, the primary current flows to the capacitor 8 via the body diode of the second switch 7 (see the part (c) of FIG. 2). Then, after a predetermined rest period, the first control drive circuit 9 turns on the second switch 7 (see the part (b) of FIG. 2). After the second switch 7 turned on, the voltage of the secondary winding 32 reaches the voltage of the output capacitor 5, and a current flows through the diode 42 (see the part (d) of FIG. 2).

The second control drive circuit 10 turns on the third switch 41 after the turn-on of the second switch 7 (see the part (e) of FIG. 2). At this time, the secondary current flowing through the secondary winding 32 has a current waveform shown in the part (d) of FIG. 2 because of the resonance of the capacitor 8 and the leakage inductance of the transformer 3. After an on-period preset by the second control drive circuit 10 has passed, the third switch 41 turns off (see the part (e) of FIG. 2), and the secondary current flows through the diode 42. Since the secondary current flowing through the secondary winding 32 has a resonance waveform, it becomes zero soon (see the part (d) of FIG. 2). Since the second switch 7 is in an on-state, the primary current of the primary winding 31 continues to flow in the reverse direction even after the release of the excited energy is completed, thereby exciting the transformer 3 in the reverse direction (see the part (c) of FIG. 2).

Next, when the on-period preset by the first control drive circuit 9 has passed, and when the second switch 7 turns off, excited energy stored in the reverse direction is released, whereby the winding voltages of the transformer 3 are reversed. As a result, the voltage of the primary winding 31 reaches the voltage of the input DC power supply 1, and the current of the primary winding 31 is returned to the input DC power supply 1 via the body diode of the first switch 2. Then, after the predetermined rest period has passed, the first control drive circuit 9 turns on the first switch 2 (see the part (a) of FIG. 2).

By repeating the above-mentioned operations, a power is transferred to the output capacitor 5, and a desired output DC voltage is supplied to the load 6. The first control drive circuit 9 detects the output DC voltage and adjusts the on-periods and off-periods of the first switch 2 and the second switch 7. By adjusting the on/off-periods of the first switch 2 and the second switch 7, the output DC voltage of the switching power converter can be stabilized.

As described above, in the switching power converter of Embodiment 1, the second control drive circuit 10 turns on the third switch 41 after the predetermined period has passed after the turn-on of the second switch 7, and turns off the third switch 41 before the predetermined period from the turn-off of the second switch 7. With this configuration, in the switching power converter of Embodiment 1, a current flows through the diode 42 only in the short times in the front and rear portions in the rectifying period of the secondary current of the transformer 3. However, since the secondary current of the transformer 3 has a resonance waveform, the majority of the secondary current flows through the third switch 41, whereby the current flowing through the diode 42 has a very small value. Hence, the effect of reducing a conduction loss owing to synchronous rectifying is not impaired, and a diode having a low current rating can also be used for the diode 42.

In Embodiment 1, the switching power converter wherein the series circuit comprising the second switch 7 and the capacitor 8 is connected in parallel with the primary winding 31 of the transformer 3 is shown. However, similar effect to that of the switching power converter of Embodiment 1 is obtainable with a modified configuration wherein the series circuit comprising the second switch 7 and the capacitor 8 is connected across the first switch 2.

<<Embodiment 2>>

Figure 3:
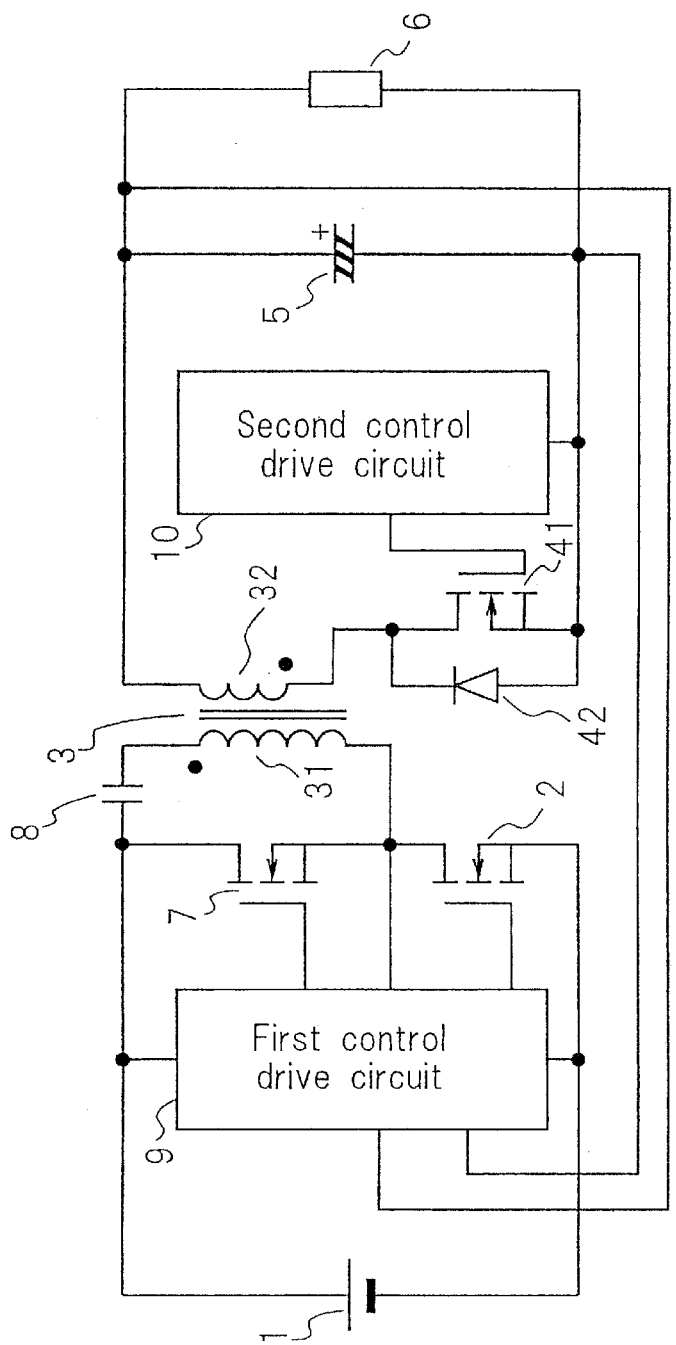
FIG. 3 is a circuit diagram showing the configuration of a switching power converter in accordance with Embodiment 2 of the present invention.

Next, a switching power converter of Embodiment 2 in accordance with the present inversion will be described referring to the accompanying drawings. FIG. 3 is a circuit diagram showing the configuration of the switching power converter of Embodiment 2 of the present invention. In FIG. 3, the components having functions and configurations similar to those of the above-mentioned switching power converter of Embodiment 1 shown in FIG. 1 are represented by the same reference numerals, and their explanations are omitted. The switching power converter of Embodiment 2 differs from the switching power converter of Embodiment 1 in the connection positions of the second switch 7 and the capacitor 8. In the switching power converter of Embodiment 2, a series circuit comprising the first switch 2 and the second switch 7 is connected in parallel with the input DC power supply 1, and a series circuit comprising the primary winding 31 and the capacitor 8 is connected in parallel with the second switch 7.

Next, the operations of the switches of the switching power converter of Embodiment 2 will be described.

First, when the first switch 2 is an on-state, a primary current flows through the primary winding 31 of the transformer 3 from the input DC power supply 1 via the capacitor 8, and excited energy is stored in the transformer 3. In this state, when the first switch 2 turns off, the stored excited energy is released. Hence, the winding voltages of the transformer 3 are reversed. The voltage of the primary winding 31 of the transformer 3 reaches the voltage of the capacitor 8, and the primary current flows to the capacitor 8 via the body diode of the second switch 7. After a predetermined rest period, the first control drive circuit 9 turns on the second switch 7. Then, the voltage of the secondary winding 32 reaches the voltage of the output capacitor 5, and a current flows through the diode 42. The second control drive circuit 10 turns on the third switch 41 after a predetermined period has passed after the turn-on of the second switch 7. At this time, the secondary current flowing through the secondary winding 32 of the transformer 3 becomes a current owing to the resonance of the capacitor 8 and the leakage inductance of the transformer 3.

After an on-period preset in the second control drive circuit 10 has passed, the third switch 41 turns off, and the secondary current flows through the diode 42. Since the secondary current has a resonance waveform at this time, it becomes zero soon. Since the second switch 7 is in an on-state, the primary current of the transformer 3 continues to flow in the reverse direction even after the release of the excited energy is completed, thereby exciting the transformer 3 in the reverse direction.

Next, when the on-period of the second switch 7 preset by the first control drive circuit 9 has passed, and when the second switch 7 turns off, excited energy stored in the reverse direction is released. Since the excited energy is released in this way, the winding voltages of the transformer 3 are reversed, and the voltage of the primary winding 31 reaches the voltage difference between the input DC power supply 1 and the capacitor 8. Hence, the current flowing through the primary winding 31 of the transformer 3 is returned to the input DC power supply 1 via the body diode of the first switch 2. Then, after the predetermined rest period has passed, the first control drive circuit 9 turns on the first switch 2.

By repeating the above-mentioned operations, a power is transferred to the output capacitor 5, and a desired output DC voltage is supplied to the load 6. The first control drive circuit 9 detects the output DC voltage and adjusts the on-periods and off-periods of the first switch 2 and the second switch 7. By adjusting the on/off-periods of the first switch 2 and the second switch 7, the switching power converter can be stabilized.

In the switching power converter of Embodiment 2, the second control drive circuit 10 turns on the third switch 41 after a predetermined period has passed after the turn-on of the second switch 7, and turns off the third switch 41 before a predetermined period from the turn-off of the second switch 7. With this configuration, a current flows through the diode 42 only in short times in the front and rear portions in the rectifying period of the secondary current. However, since the secondary current of the transformer 3 has a resonance waveform, the majority of the current flows through the third switch 41, whereby the current flowing through the diode 42 has a very small value. As a result, the effect of reducing a conduction loss owing to synchronous rectifying is not impaired even when the diode 42 is used, and a diode having a low current rating can also be used for the diode 42.

In Embodiment 2, the switching power converter wherein the series circuit comprising the primary winding 31 of the transformer 3 and the capacitor 8 is connected in parallel with the second switch 7 is shown. However, similar effect to that of the switching power converter of Embodiment 2 is obtainable with a modified configuration wherein the series circuit comprising the primary winding 31 and the capacitor 8 is connected in parallel with the first switch 2.

As described above, in the switching power converter of Embodiment 2, since the current flowing on the secondary side has a resonance waveform, a conduction loss owing to the drive timing of the synchronous rectifying switch occurs less, whereby the current capacity of the diode connected in parallel with the synchronous rectifying switch can be reduced.

<<Embodiment 3>>

Figure 4:
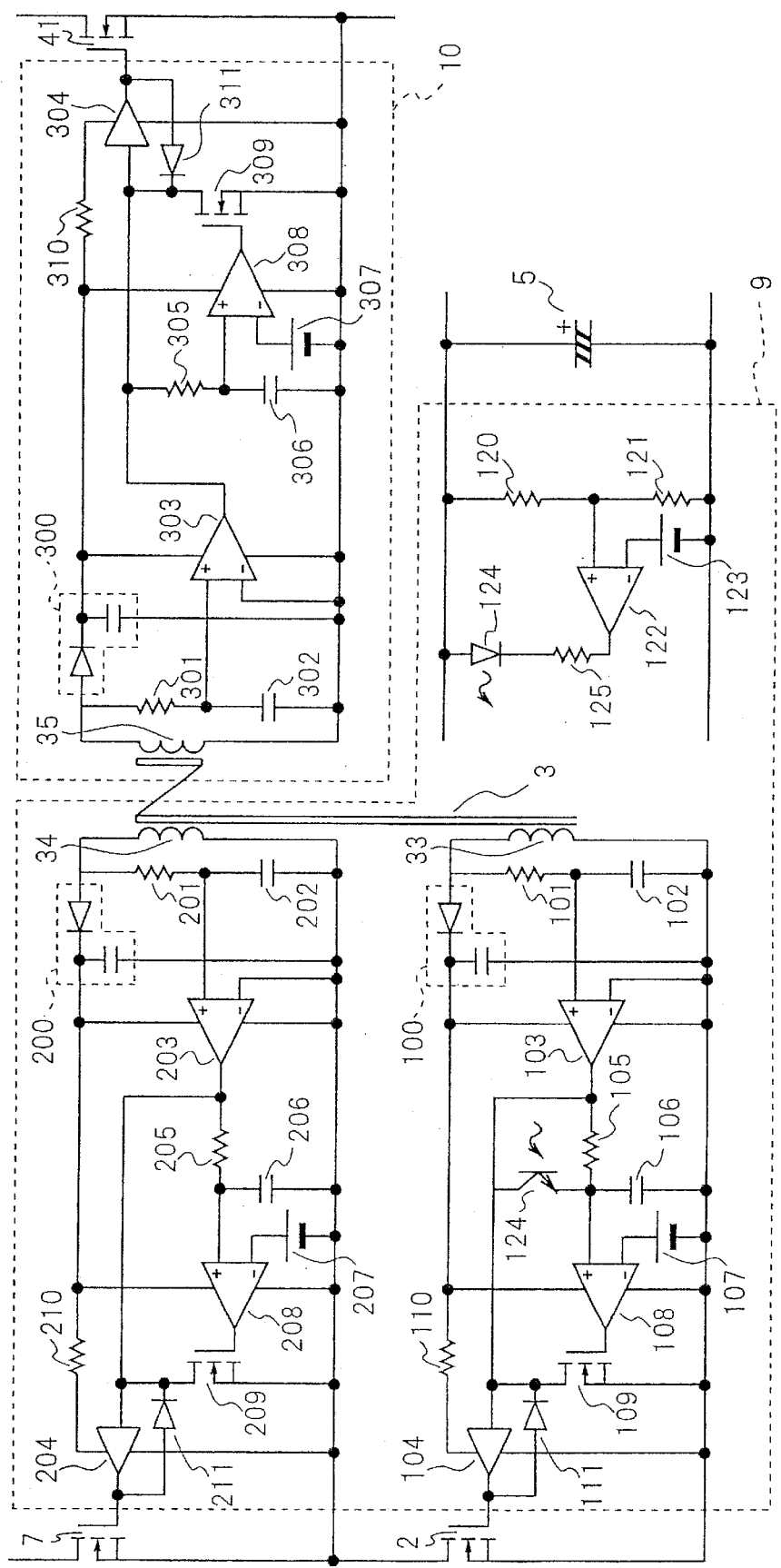
FIG. 4 is a circuit diagram showing the configurations of the control drive circuits of a switching power converter in accordance with Embodiment 3 of the present invention.

Next, a switching power converter of Embodiment 3 in accordance with the present inversion will be described below referring to the accompanying drawings. FIG. 4 is a circuit diagram showing specific configurations of the first control drive circuit 9 and the second control drive circuit 10 for use in the above-mentioned embodiments, as the switching power converter of Embodiment 3 of the present invention. In FIG. 4, the components having functions and configurations similar to those of the above-mentioned switching power converter of Embodiment 1 shown in FIG. 1 are represented by the same reference codes, and their explanations are omitted.

In FIG. 4, the transformer 3 has a first auxiliary winding 33, a second auxiliary winding 34 and a third auxiliary winding 35, and first, second and third rectifying smoothing circuits 100, 200 and 300, each comprising a diode and a capacitor, are connected to the first, second and third auxiliary windings 33, 34 and 35, respectively. The first, second and third rectifying smoothing circuits 100, 200 and 300 rectify and smooth flyback voltages generating at the first, second and third auxiliary windings 33, 34 and 35.

The voltage of the first auxiliary winding 33 is detected by a resistor 101 and a capacitor 102. The detected voltage of the first auxiliary winding 33 is input to the positive input terminal of a comparator 103, and the voltage of the first auxiliary winding 33 is compared with zero voltage.

When the voltage of the first auxiliary winding 33 becomes a negative voltage in accordance with the reversion of the winding voltages of the transformer 3 owing to the turn-off of the second switch 7, after a predetermined delay time owing to the resistor 101 and the capacitor 102, the comparator 103 outputs an "H" signal. By virtue of this "H" signal of the comparator 103, the first switch 1 becomes an on-state via a power amplifier 104.

The output DC voltage is detected by resistors 120 and 121, and compared with a reference voltage 123 and amplified by an error amplifier 122. The output signal of the error amplifier 122 is fed back to the primary side via a photo-coupler 124. Together with a resistor 105, the phototransistor of the photo-coupler 124 is connected to the output of the comparator 103; when the comparator 103 outputs the "H" signal, a capacitor 106 is charged. The charged voltage of the capacitor 106 is compared with a reference voltage 107 by a comparator 108. When this charged voltage reaches the reference voltage 107, the comparator 108 outputs an "H" signal, thereby turning on a transistor 109. As a result, the first switch 2 turns off.

The current flowing through the phototransistor of the photo-coupler 124 increases when the output DC voltage becomes a preset value or more, and decreases when the voltage becomes lower. In other words, the on-period of the first switch 2 is controlled so as to be shortened when the output DC voltage becomes the preset value or more, and so as to be lengthened conversely when the voltage becomes lower than the preset value.

Next, the voltage generating at the second auxiliary winding 34 is detected by a resistor 201 and a capacitor 202. The detected voltage of the second auxiliary winding 34 is input to the positive input terminal of a comparator 203 and compared with zero voltage. When the voltage of the second auxiliary winding 34 becomes a positive voltage in accordance with the reversion of the winding voltages of the transformer 3 owing to the turn-off of the first switch 2, after a predetermined delay time owing to the resistor 201 and the capacitor 202, the comparator 203 outputs an "H" signal. This "H" signal turns on the second switch 7 via a power amplifier 204. A resistor 205 is connected to the output terminal of the comparator 203, and a capacitor 206 connected to an end of this resistor 205 is charged when the comparator 203 outputs the "H" signal. The charged voltage of the capacitor 206 is compared with a reference voltage 207 by a comparator 208. When this charged voltage reaches the reference voltage 207, the comparator 208 outputs an "H" signal, thereby turning on a transistor 209. By virtue of the on-state of the transistor 209, the second switch 7 turns off. The on-period of the second switch 7 is determined by the time constant of the resistor 205 and the capacitor 206.

Next, the voltage generating at the third auxiliary winding 35 is detected by a resistor 301 and a capacitor 302. The detected voltage of the third auxiliary winding 35 is input to the positive input terminal of a comparator 303 and compared with zero voltage.

The voltage of the third auxiliary winding 35 becomes a positive voltage in accordance with the reversion of the winding voltages of the transformer 3 owing to the turn-off of the first switch 2. When the third auxiliary winding 35 becomes the positive voltage, after a predetermined delay time owing to the resistor 301 and the capacitor 302, the comparator 303 outputs an "H" signal. This "H" signal turns on the third switch 41 via a power amplifier 304. The delay time owing to the resistor 301 and the capacitor 302 is set so as to be longer than the delay time owing to the resistor 201 and the capacitor 202, and the third switch 41 is set so as to turn on after a predetermined time from the turn-on of the second switch 7.

A resistor 305 is connected to the output terminal of the comparator 303. When the comparator 303 outputs an "H" signal, a capacitor 306 is charged. The charged voltage of the capacitor 306 is compared with a reference voltage 307 by a comparator 308. When this charged voltage reaches the reference voltage 307, the comparator 308 outputs an "H" signal, thereby turning on a transistor 309. By virtue of the on-state of the transistor 309, the third switch 41 turns off. The on-period of the third switch 41 is determined by the time constant of the resistor 305 and the capacitor 306. This time constant is set shorter than the on-period of the second switch 7 that is set by the time constant of the resistor 205 and the capacitor 206, and the third switch 41 is configured so as to turn off before a predetermined time from the turn-off of the second switch 7.

As described above, in Embodiment 3, the on-period of the second switch 7 is fixed, and the on-period of the first switch 2 is adjusted to stabilize the output DC voltage; furthermore, the second switch 7 is set so as to turn on after a predetermined time has passed after the turn-off of the first switch 2. Still further, the first switch 2 is set so as to turn on after a predetermined time has passed after the turn-off of the second switch 7. In the switching power converter of Embodiment 3, the on-period of the third switch 41 can be set easily by the on/off control of the first switch 2 and the second switch 7.

In the switching power converter of Embodiment 3, the on-period of the second switch for determining the conduction time of the secondary current is fixed, whereby the on-period of the synchronous rectifying switch can also be fixed, and the configuration of the control drive circuit for turning on/off the synchronous rectifying switch can be simplified.

<<Embodiment 4>>

Figure 5:
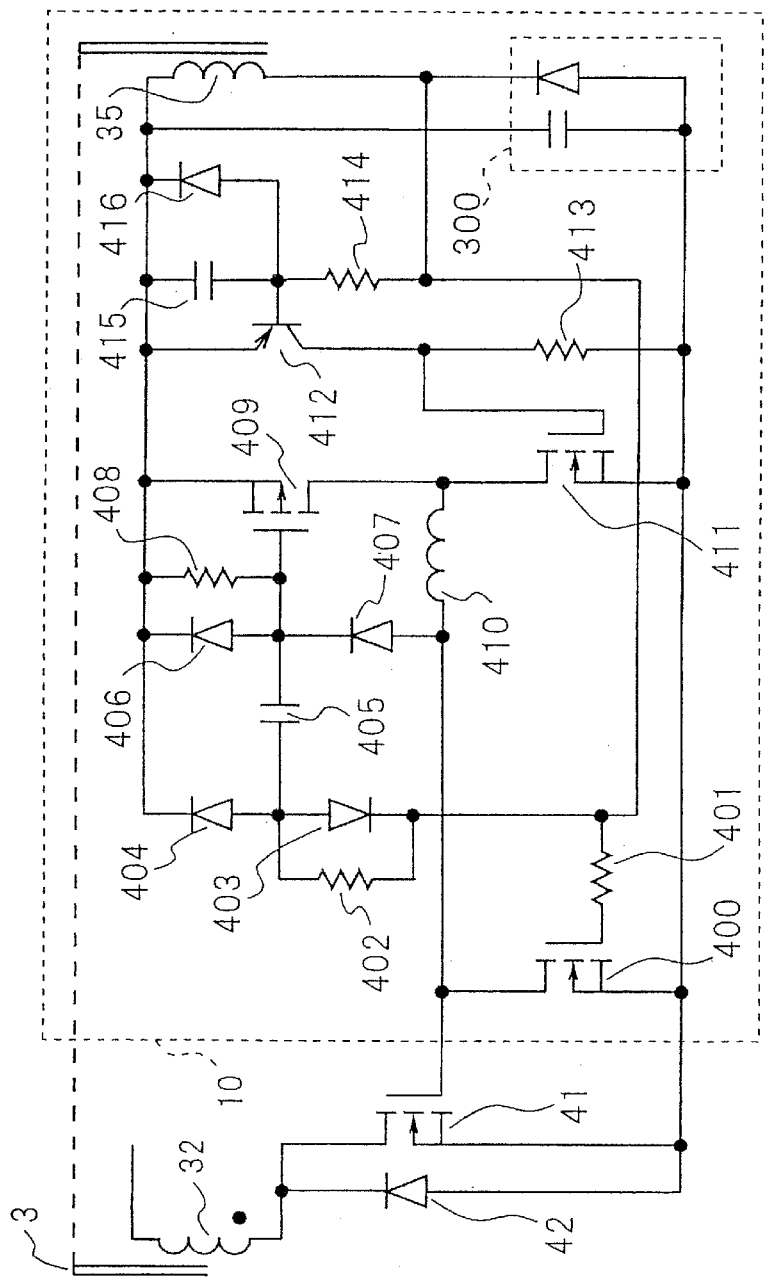
FIG. 5 is a circuit diagram showing the configuration of the control drive circuit of a switching power converter in accordance with Embodiment 4 of the present invention.
Figure 6:
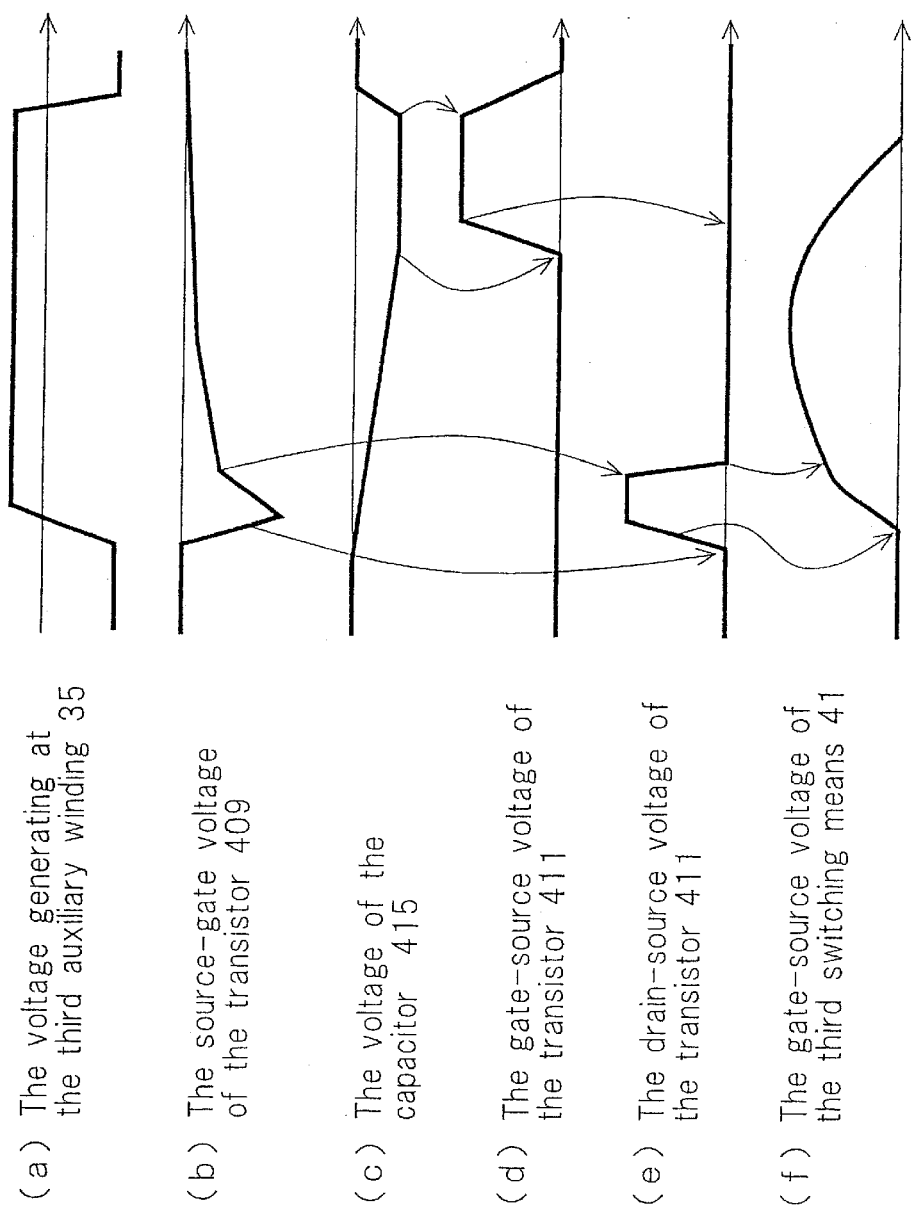
FIG. 6 is a waveform diagram at the main portions of the switching power converter shown in FIG. 5.

Next, a switching power converter of Embodiment 4 in accordance with the present inversion will be described below referring to the accompanying drawings. FIG. 5 is a circuit diagram showing a specific configuration of the second control drive circuit 10 for use in the above-mentioned embodiments, as the switching power converter of Embodiment 4 of the present invention. In FIG. 5, the components having functions and configurations similar to those of the above-mentioned switching power converter of Embodiment 1 shown in FIG. 1 are represented by the same reference numerals, and their explanations are omitted. FIG. 6 is a waveform diagram at the main portions of the second control drive circuit 10 in the switching power converter of Embodiment 3. In FIG. 6, a part (a) shows the waveform of the voltage generating at the third auxiliary winding 35, a part (b) shows the waveform of the source-gate voltage of a transistor 409, a part (c) shows the waveform of the voltage of a capacitor 415, a part (d) shows the waveform of the gate-source voltage of a transistor 411, a part (e) shows the waveform of the drain-source voltage of the transistor 411, and a part (f) shows the waveform of the gate-source voltage of the third switch 41.

The configuration and operation of the switching power converter of Embodiment 4 will be described below.

The voltage (see the part (a) of FIG. 6) generating at the third auxiliary winding 35 of the transformer 3 is converted into a DC voltage by a rectifying smoothing circuit 300 comprising a diode and a capacitor.

First, when the first switch 2 (see FIG. 1) is in an on-state, a voltage is supplied to the gate of a MOSFET 400 via a resistor 401. Hence, the MOSFET 400 becomes an on-state, and the third switch 41 becomes an off-state. At this time, the voltage generating at the third auxiliary winding 35 turns off a MOSFET 409 serving as a first transistor via a resistor 402 and turns off a transistor 412 via a resistor 414. Since the transistor 412 is in an off-state, a MOSFET 411 serving as a second transistor is also in an off-state.

By the turn-off of the first switch 2, the winding voltages of the transistor 3 are reversed as described in the explanation of Embodiment 1. By the reversion of the winding voltages of the transistor 3, the MOSFET 400, the gate of which is connected via the resistor 401, becomes an off-state. Furthermore, the MOSFET 409 serving as the first transistor, which is connected via a diode 403 and a capacitor 405, becomes an on-state (see the parts (b) and (e) of FIG. 6). Hence, a DC voltage obtained from the voltage of the third auxiliary winding 35 by the rectifying smoothing circuit 300 is applied to an inductor 410, and a resonance occurs owing to the inductor 410 and a stray capacitance existing equivalently between the gate and source of the third switch 41, whereby the gate voltage of the third switch 41 rises gradually (see the part (f) of FIG. 6).

As the gate voltage rises, the third switch 41 turns on following the turn-off of the first switch 2 and the turn-on of the second switch 7. At this time, the diode 42 has already been in a conduction state. However, since the secondary current is a resonance current as described above in the explanations of the embodiments, no large current flows through the diode 42. The gate voltage of the MOSFET 409 lowers as the capacitor 405 is charged, and the MOSFET 409 becomes an off-state soon. The time required until the MOSFET 409 becomes the off-state can be set by the time constant of a circuit containing a resonance 408 and the capacitor 405. When the MOSFET 409 turns off, the voltage of the inductor 410 is reversed, and a voltage is supplied to the gate of the third switch 41 by a current flowing via the body diode of the MOSFET 411.

On the other hand, the winding voltages of the transformer 3 are reversed. By the reversion of the winding voltages of the transformer 3, the capacitor 415, connected via the resistor 414, is charged. The voltage of the capacitor 415 soon drives the base of the transistor 412 to turn it on (see the parts (c) and (d) of FIG. 6).

When the transistor 412 becomes an on-state, the MOSFET 411 also becomes an on-state. The time required until the transistor 412 becomes the on-state can be set by the time constant of the capacitor 415 and the resistor 414. The time required until the transistor 412 becomes the on-state is set after the turn-off of the first transistor 409. In other words, the transistor 412 becomes the on-state while the body diode of the MOSFET 411 conducts. In this state, the resonance of the inductor 410 and the stray capacitance continues, and the stray capacitance is discharged soon. As a result, the gate voltage of the third switch 41 lowers. As the gate voltage of the third switch 41 lowers, the third switch 41 turns off; however, the secondary current, that is, the resonance current, passes its peak and becomes zero current or close thereto. In other words, the inductance of the inductor 410 is set so that the resonance frequency of the resonance of the inductance and the stray capacitance at the gate of the third switch 41 becomes nearly equal to the resonance frequency of the secondary current.

Then, the secondary current stops flowing, and the reversion of the winding voltages of the transformer 3 turns on the MOSFET 400, whereby the off-state of the third switch 41 is maintained.

As described above, in the switching power converter of Embodiment 4, since the secondary current of the transformer 3 is a resonance current, the conventional high-speed on/off-control for the third switch 41 serving as a synchronous rectifying device for rectifying the secondary current is not required. Hence, its drive current can have a resonance waveform, and any drive loss and switching noise can be reduced.

<<Embodiment 5>>

Figure 7:
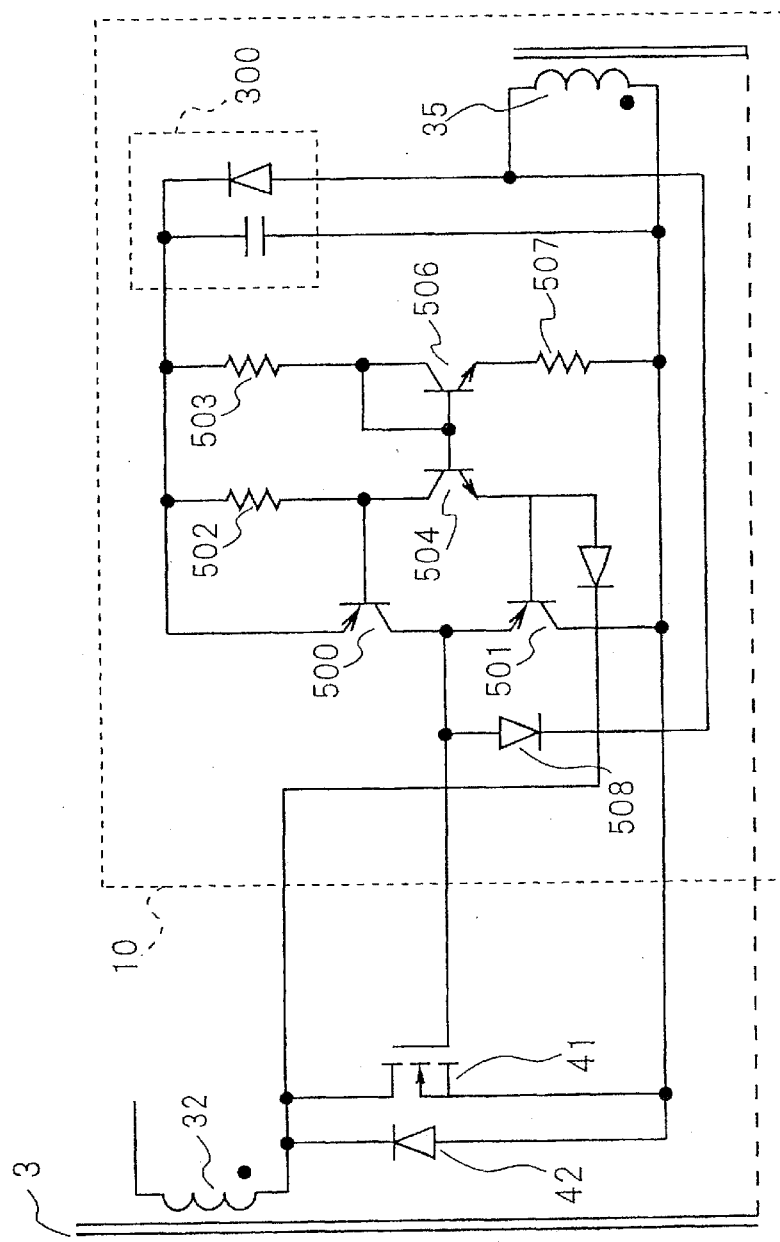
FIG. 7 is a circuit diagram showing the configuration of the control drive circuit of a switching power converter in accordance with Embodiment 5 of the present invention.
Figure 8:
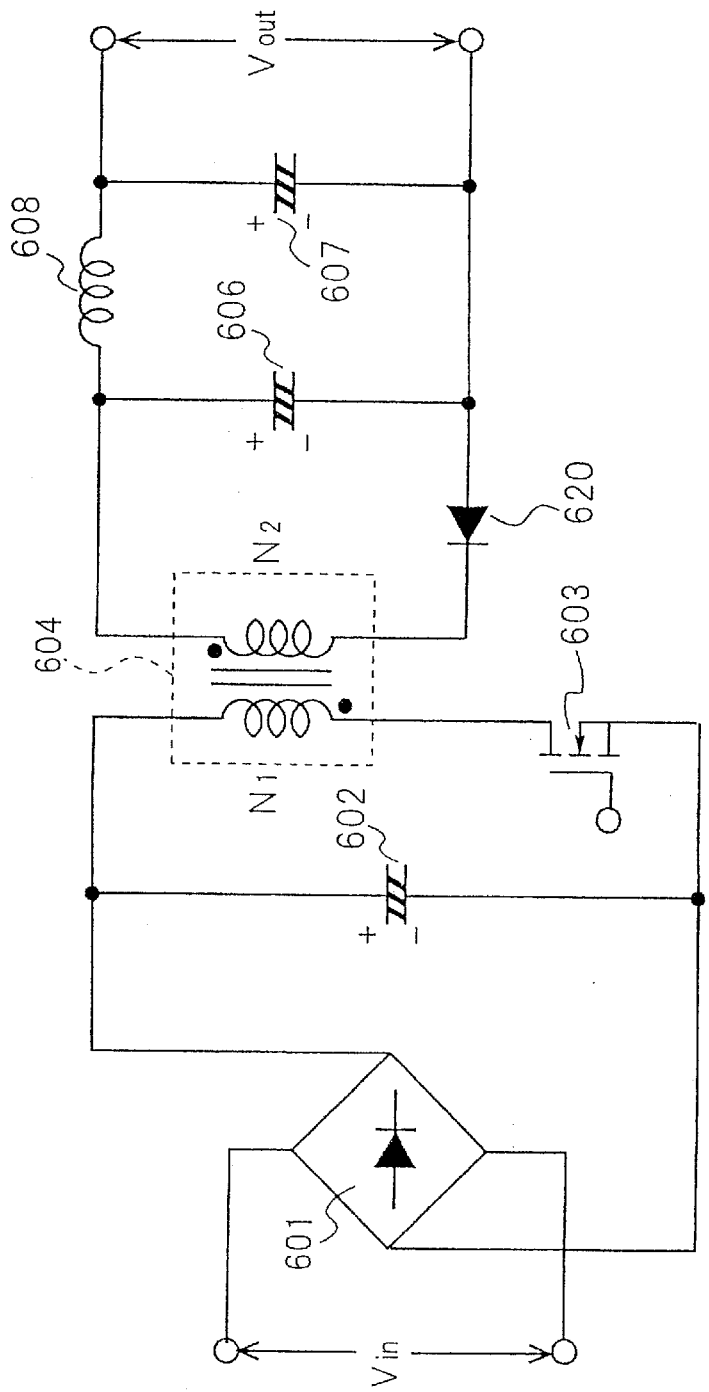
FIG. 8 is the circuit diagram showing the configuration of the conventional switching power converter.
Figure 9:
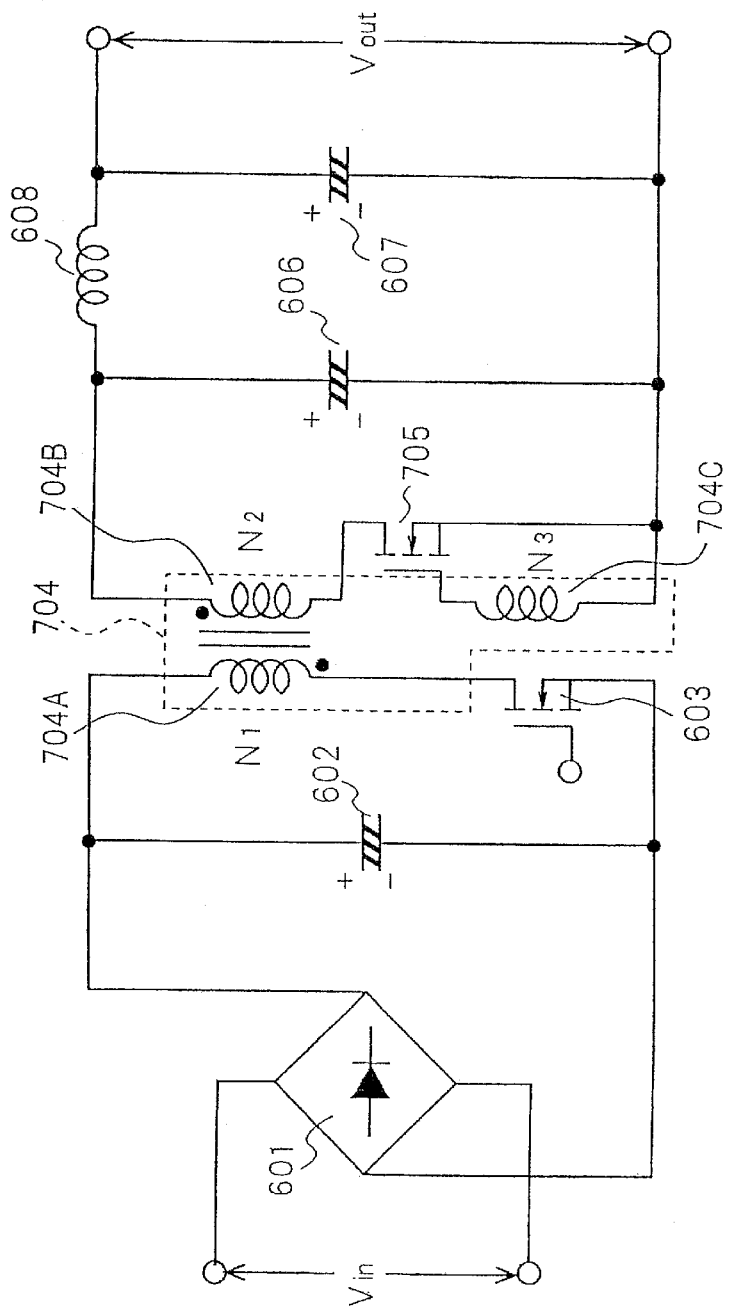
FIG. 9 is the circuit diagram showing the configuration of the other conventional switching power converter.
Figure 10:
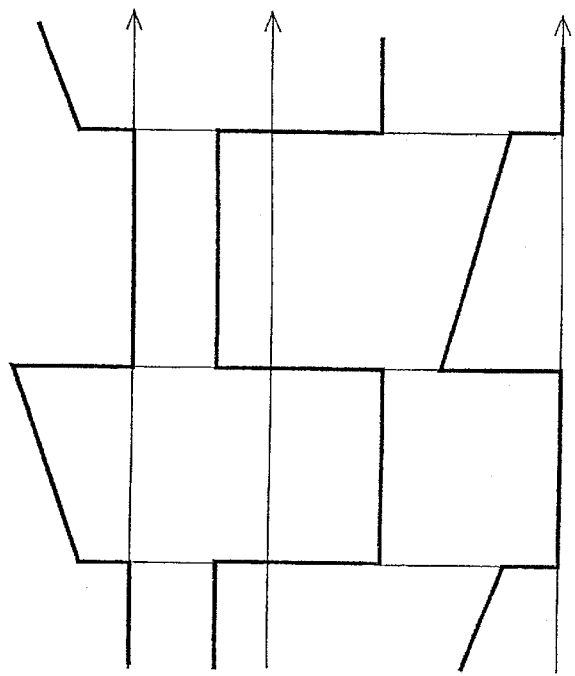
FIG. 10 is the waveform diagram at the main portions of the other conventional switching power converter shown in FIG. 9.
Figure 11:
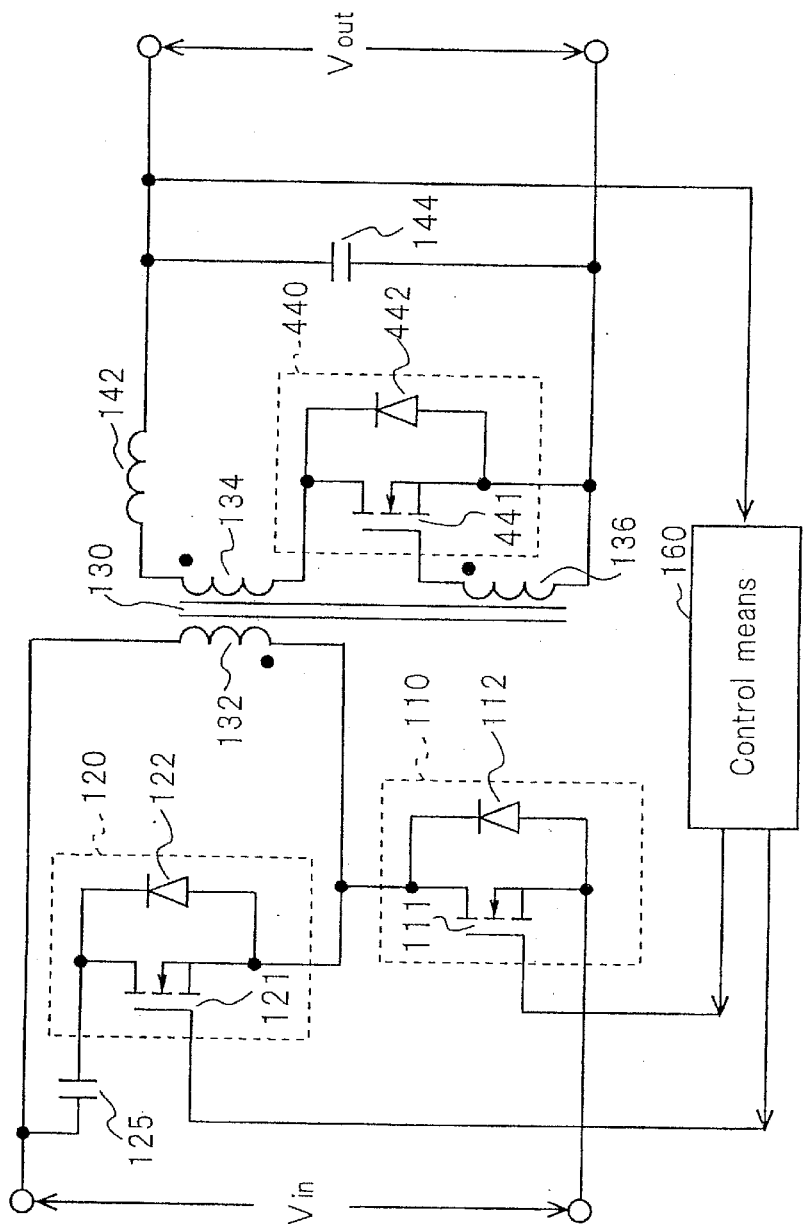
FIG. 11 is the circuit diagram showing the configuration of the still other conventional switching power converter.

Next, a switching power converter of Embodiment 5 in accordance with the present inversion will be described below referring to the accompanying drawings. FIG. 7 is a circuit diagram showing a specific configuration of the second control drive circuit 10 for use in the above-mentioned embodiments, as the switching power converter of Embodiment 5 of the present invention. In FIG. 7, the components having functions and configurations similar to those of the above-mentioned switching power converter of Embodiment 1 shown in FIG. 1 are represented by the same reference numerals, and their explanations are omitted.

The configuration and operation of the switching power converter of Embodiment 5 will be described below.

The voltage generating at the third auxiliary winding 35 of the transformer 3 is converted into a DC voltage by the rectifying smoothing circuit 300 comprising a parallel circuit of a diode and a capacitor.

First, when the first switch 2 (see FIG. 1) is in an on-state, since the third auxiliary winding 35 applies a negative voltage to the gate of the third switch 41 via a diode 508, the third switch 41 is in an off-state. At the same time, the voltage of the diode 505 and the emitter voltage of the transistor 504 are higher than zero voltage, the transistor 504 becomes an off-state, and the transistor 506 and the transistor 501 become on-states.

Next, as the first switch 2 turns on, the winding voltages of the transformer 3 are reversed, and the second switch 7 becomes an on-state, whereby the secondary current of the transistor 3 starts flowing via the diode 42. Hence, the cathode terminal of the diode 505 has zero voltage or less, and the diode 505 and the transistor 504 become on-states, and the transistor 506 and the transistor 501 becomes off-states. Since the transistor 504 becomes the on-state, the transistor 500, the base current of which is supplied via a resistor 502, becomes and on-state, whereby the third switch 41 becomes an on-state. Since the secondary current flowing through the third switch 41 is a resonance current, the current flowing through the third switch 41 reduces soon, and the forward voltage of the third switch 41 also lowers. When the forward voltage of the third switch 41 reduces to zero voltage or less, the diode 505 and the transistor 504 become off-states; on the other hand, the transistor 506 and the transistor 501 become on-states. As a result, the gate voltage of the third switch 41 reduces, and the third switch 41 becomes an off-state.

As described above, in the switching power converter of Embodiment 5, the third switch 41 can be set at the on-state only when a current flows in the forward direction of the third switch 41.

Hence, the switching power converter of Embodiment 5 is configured so that a current flows through the diode connected in parallel therewith before the turn-on and after the turn-off of the synchronous rectifying switch. For this reason, by detecting the forward voltage of the diode, the switching power converter of Embodiment 5 can on/off-control the third switch 41, whereby the control drive circuit can have a simple configuration.

As clarified from the above detailed explanations of the embodiments, the present invention has the following effects.

In the switching power converter of the present invention, since the current flowing on the secondary side has a resonance waveform, a conduction loss owing to the drive timing of the synchronous rectifying switch occurs less, whereby the current capacity of the diode connected in parallel with the synchronous rectifying switch can be reduced.

In addition, in the switching power-converter of the present invention, the on-period of the second switch for determining the conduction time of the secondary current is fixed, whereby the on-period of the synchronous rectifying switch can also be fixed, and the configuration of the control drive circuit for turning on/off the synchronous rectifying switch can be simplified.

Furthermore, in the switching power converter of the present invention, the drive voltage for turning on/off the synchronous rectifying switch has a resonance waveform having a resonance frequency close to the resonance frequency of the secondary current, whereby any drive loss and switching noise can be reduced.

Still further, the switching power converter of the present invention is configured so that a current flows through the diode connected in parallel before the turn-on and after the turn-off of the synchronous rectifying switch, whereby by detecting the forward voltage of the diode, the control drive circuit for on/off control can have a simple configuration.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A switching power converter comprising:

a DC input power supply, a transformer having at least a primary winding and a secondary winding, a first switch connected in series with said primary winding to form a series circuit, the series circuit being connected in parallel with said DC input power supply, a second switch connected equivalently across both ends of said primary winding via a capacitor, a third switch connected in series with said secondary winding, a first control drive circuit for alternately turning on/off said first switch and said second switch and having predetermined on-periods, off-periods and rest periods by detecting the output of the series circuit of said third switch and said secondary winding, and a second control drive circuit for turning on said third switch after a predetermined period from the turn-on of said second switch and for turning off said third switch before a predetermined period from the turn-off of said second switch.

2. A switching power converter in accordance with claim 1, wherein said DC input power supply is transformed to a DC output voltage by virtue of the on/off operation of said first switch and said second switch, and a current flowing through said secondary winding of said transformer has a waveform of the resonance of said capacitor and an inductor including a leakage inductance of said transformer and connected equivalently in series with said primary winding or said secondary winding of said transformer.

3. A switching power converter in accordance with claim 1 or 2, wherein said first control drive circuit fixes the on-period of said second switch, adjusts the on-period of said first switch to stabilize said output DC voltage and makes settings so that said second switch turns on after said first switch turned off and so that said first switch turns on after said second switch turned off.

4. A switching power converter in accordance with claim 1 or 2, wherein said second control drive circuit is configured so that one terminal of an inductor is connected to the gate terminal of said third switch and the other terminal of said inductor is connected to a first transistor for pulling up the level of the other terminal to an "H" level and a second transistor for pulling down the level to an "L" level, so that said first transistor becomes an on-state in a predetermined time when the voltage of said third switch lowers, so that said second transistor becomes an on-state in a predetermined time after the turn-off of said first transistor, and so that said first transistor keeps an off-state while said third switch is off.

5. A switching power converter in accordance with claim 1 or 2, wherein said second control drive circuit turns on said third switch when detecting that a forward voltage has generated in said third switch, and said second control drive circuit turns off said third switch when detecting that said forward voltage becomes lower than a predetermined value.

6. A switching power converter comprising:

a DC input power supply, a series circuit of a first switch and a second switch connected in parallel with said DC input power supply, a transformer having at least a primary winding and a secondary winding, a capacitor connected across both ends of any one of said first switch and said second switch via said primary winding, a third switch connected in series with said secondary winding, a first control drive circuit for alternately turning on/off said first switch and said second switch and having predetermined on-periods, off-periods and rest periods by detecting the output of the series circuit of said third switch and said secondary winding, and a second control drive circuit for turning on said third switch after a predetermined period from the turn-on of said second switch and for turning off said third switch before a predetermined period from the turn-off of said second switch.

7. A switching power converter in accordance with claim 6, wherein said DC input power supply is transformed to a DC output voltage by virtue of the on/off operation of said first switch and said second switch, and a current flowing through said secondary winding of said transformer has a waveform of the resonance of said capacitor and an inductor including a leakage inductance of said transformer and connected equivalently in series with said primary winding or said secondary winding of said transformer.

8. A switching power converter in accordance with claim 6 or 7, wherein said first control drive circuit fixes the on-period of said second switch, adjusts the on-period of said first switch to stabilize said output DC voltage and makes settings so that said second switch turns on after said first switch turned off and so that said first switch turns on after said second switch turned off.

9. A switching power converter in accordance with claim 6 or 7, wherein said second control drive circuit is configured so that one terminal of an inductor is connected to the gate terminal of said third switch and the other terminal of said inductor is connected to a first transistor for pulling up the level of the other terminal to an "H" level and a second transistor for pulling down the level to an "L" level, so that said first transistor becomes an on-state in a predetermined time when the voltage of said third switch lowers, so that said second transistor becomes an on-state in a predetermined time after the turn-off of said first transistor, and so that said first transistor keeps an off-state while said third switch is off.

10. A switching power converter in accordance with claim 6 or 7, wherein said second control drive circuit turns on said third switch when detecting that a forward voltage has generated in said third switch, and said second control drive circuit turns off said third switch when detecting that said forward voltage becomes lower than a predetermined value.

* * * * *